(12) United States Patent
Stokely et al.

(10) Patent No.: US 9,542,462 B1
(45) Date of Patent: Jan. 10, 2017

(54) SCALING HIGH-LEVEL STATISTICAL LANGUAGES TO LARGE, DISTRIBUTED DATASETS

(71) Applicant: Google Inc., Mountain View, CA (US)

(72) Inventors: Murray M. Stokely, Mountain View, CA (US); Karl Millar, Mountain View, CA (US)

(73) Assignee: Google Inc., Mountain View, CA (US)

( * ) Notice: Subject to any disclaimer, the term of this patent is extended or adjusted under 35 U.S.C. 154(b) by 486 days.

(21) Appl. No.: 13/918,615

(22) Filed: Jun. 14, 2013

Related U.S. Application Data

(60) Provisional application No. 61/659,731, filed on Jun. 14, 2012.

(51) Int. Cl.
*G06F 17/30* (2006.01)

(52) U.S. Cl.
CPC ................ *G06F 17/30569* (2013.01)

(58) Field of Classification Search
CPC ............ G06F 17/30958; G06F 17/30625; G06F 17/30539; G06F 17/30572; G06F 17/30569
USPC ........................................................ 707/722
See application file for complete search history.

(56) References Cited

U.S. PATENT DOCUMENTS

| | | | | |
|---|---|---|---|---|
| 7,092,941 | B1* | 8/2006 | Campos | 707/737 |
| 7,580,918 | B2* | 8/2009 | Chang et al. | |
| 8,046,385 | B2* | 10/2011 | Wald et al. | 707/802 |
| 8,631,044 | B2* | 1/2014 | Jebara et al. | 707/798 |
| 8,874,502 | B2* | 10/2014 | Williamson | 707/603 |
| 2002/0118954 | A1* | 8/2002 | Barton et al. | 386/83 |
| 2006/0015291 | A1* | 1/2006 | Parks et al. | 702/179 |
| 2007/0239694 | A1* | 10/2007 | Singh et al. | 707/3 |
| 2009/0193039 | A1* | 7/2009 | Bradley et al. | 707/100 |
| 2009/0228443 | A1* | 9/2009 | Lapin et al. | 707/3 |
| 2011/0173189 | A1* | 7/2011 | Singh et al. | 707/722 |
| 2012/0317142 | A1* | 12/2012 | Broecheler et al. | 707/770 |
| 2013/0188866 | A1* | 7/2013 | Obrador et al. | 382/165 |

* cited by examiner

*Primary Examiner* — Syed Hasan
*Assistant Examiner* — Saba Ahmed
(74) *Attorney, Agent, or Firm* — Fish & Richardson P.C.

(57) ABSTRACT

A system and method for performing large-scale data processing using a statistical programming language are disclosed. One or more high-level statistical operations may be received. The received high-level statistical operations may be dynamically translated into a graph of low-level data operations. The unnecessary operations may be removed and operations may be fused or chained together. Operations may then be grouped into distributed data processing operation. The low-level operations may then be run.

18 Claims, 5 Drawing Sheets

SCALING HIGH-LEVEL STATISTICAL LANGUAGES TO LARGE, DISTRIBUTED DATASETS

The present application claims priority to U.S. Provisional Patent Application Ser. No. 61/659,731, filed Jun. 14, 2012, the entire disclosure of which is hereby incorporated by reference.

BACKGROUND

Data analysts and statisticians are interested in performing statistical analysis on large-scale datasets such as crawled documents, web content, web log requests, search traffic, and advertisement impressions. These large-scale datasets, which may be obtained from the Internet, can often be multi-terabytes in size.

Processing a large-scale dataset may include parallel processing, which generally involves performing some operation over each element of a dataset. The various operations may be chained together in a data-parallel pipeline to create an efficient mechanism for processing a dataset. Conventional statistical data analysis tools may not handle such massive amounts of data well.

Data analysts primarily use the R programming language for statistical data analysis since R provides more advanced statistical features than other programming languages. R is a dynamically-typed, interactive, interpreted programming language used by analysts for statistical computing and graphics. Unfortunately, R lacks capabilities for working with datasets that are too large to fit into memory.

Although there are a number of R packages that emulate the normal R capabilities, these conventional packages perform large-scale computations so slowly that they are essentially unusable for any meaningful statistical data analysis. As recognized by the inventors, there should be an easy, natural, and powerful programming environment that allows analysts and statisticians to efficiently analyze large-scale datasets.

SUMMARY

This specification describes technologies relating to large-scale data processing in general, and specifically to methods and systems for performing large-scale data processing using a statistical programming language.

In general, one aspect of the subject matter described in this specification can be embodied in a method and system for enabling efficient analysis of large-scale datasets. The method may include: receiving one or more high-level statistical operations; dynamically translating the received high-level statistical operation into a graph of low-level data operations; automatically transforming the graph of low-level data operations into an efficient graph after all high-level operations have been received and the graph is complete; and running the low-level data operations. The system may comprise one or more processing devices and on or more storage devices which store instructions that when executed by the one or more processing devices implement the following: an application that includes high-level statistical programming operations from a high-level statistical programming language; a library for large-scale data processing which specifies parallel data operations; a pipeline library, which provides functions and classes that support data-parallel pipelines and, in particular, pipelines that include chains or directed graphs of large-scale data processing operations; and a data wrapper package that wraps the functionality from the pipeline library and translates between the syntax of a high-level statistical programming language and the pipeline library that is configured to: receive one or more high-level statistical operations form the high-level statistical programming language; dynamically translate the received high-level statistical operations into a graph of low-level data operations; automatically transform the graph of low-level data operations into an efficient graph after all high-level operations have been received and the graph is complete; and run the low-level operations.

These and other embodiments can optionally include one or more of the following features: automatically transforming the graph of low-level data operation into an efficient graph may comprise removing unneeded operations, fusing operations together, and grouping operations into parallel data processing operations; the low-level operations may be run on a distributed backend system; the low-level operations may be run on locally; determining where the low-level data operations should be run can be done by calculating the sum of the low-level data operations size and comparing the sum to a given threshold, if the sum is less than the given threshold, the low-level operations may be run locally; if the sum is greater to or equal to the given threshold, the low-level operations may be run on a distributed backend system; a user may choose to run the low-level data operations locally; or a user may choose to run the low-level data operations on a distributed backend system.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

DETAILED DESCRIPTION

In general, the techniques described in this document can be used to provide standard statistical programming language, for example, R, operations, which include large-scale data processing and large scale data-parallel pipeline functionality, to an end user without the end user having to learn a new programming model or change their existing code syntax. Aspects of the inventive concepts provide implementations of R functions using data wrappers to abstract implementation details of large-scale data processing and data-parallel pipelines from an end user such as a data analyst or statistician. For ease of understanding the R programming language is used as an example, but the techniques described in this document are applicable to any high-level statistical programming language.

Large-scale processing may be performed in a distributed data processing system, such as a datacenter or a network of datacenters. For example, large-scale Internet services and the massively parallel computing infrastructure that supports such services may employ warehouse-sized computing systems, made up of thousands or tens of thousands of computing nodes.

Figure 1:
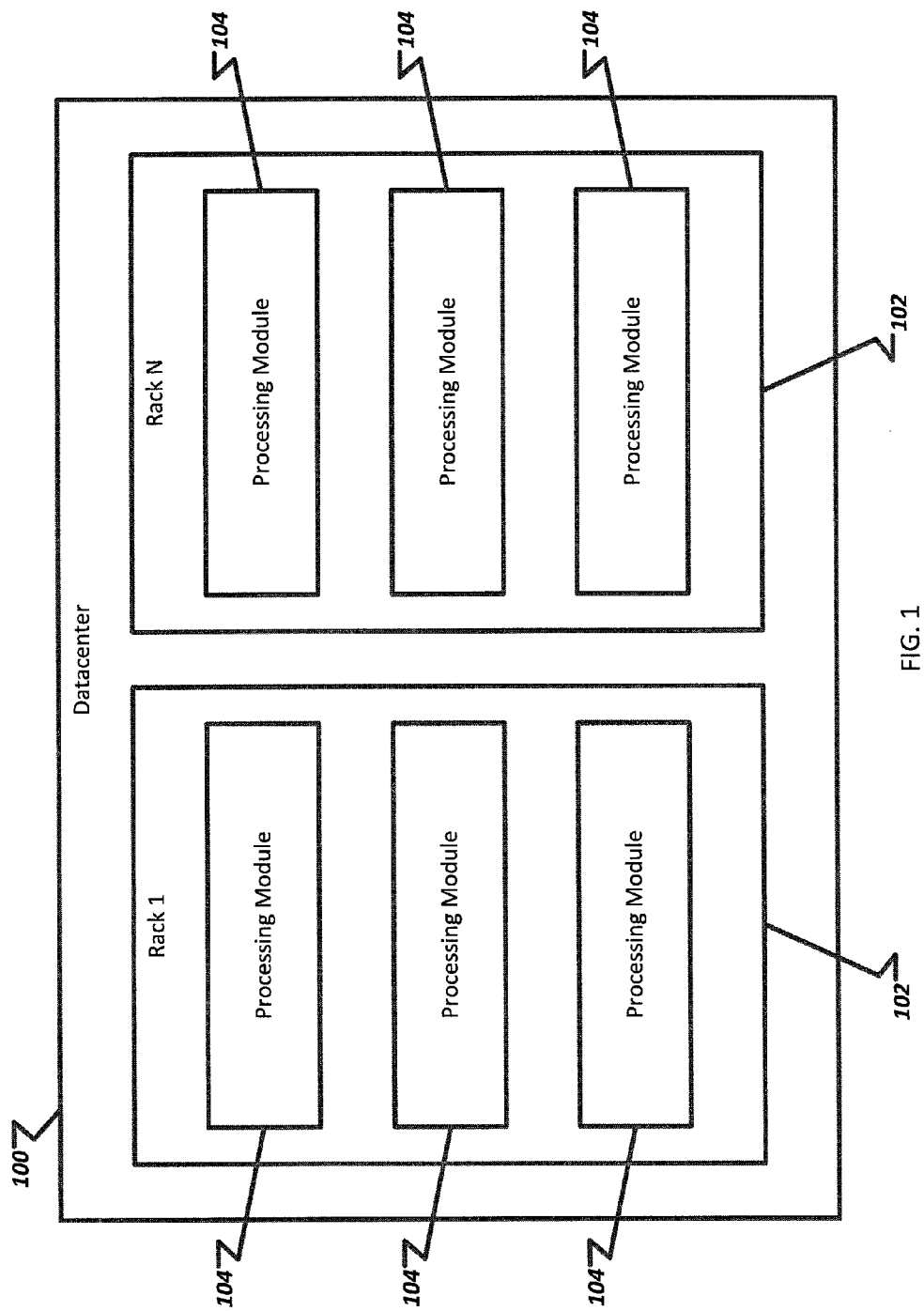
FIG. 1 is a block diagram illustrating an example of a datacenter.

FIG. 1 is a block diagram illustrating an example of a datacenter (100). The datacenter (100) is used to store data, perform computational tasks, and transmit data to other systems outside of the datacenter using, for example, a network connected to the datacenter. In particular, the datacenter (100) may perform large-scale data processing on massive amounts of data.

The datacenter (100) includes multiple racks (102). While only two racks are shown, the datacenter (100) may have many more racks. Each rack (102) can include a frame or cabinet into which components, such as processing modules (104), are mounted. In general, each processing module (104) can include a circuit board, such as a motherboard, on which a variety of computer-related components are mounted to perform data processing. The processing modules (104) within each rack (102) are interconnected to one another through, for example, a rack switch, and the racks (102) within each datacenter (100) are also interconnected through, for example, a datacenter switch.

In some implementations, the processing modules (104) may each take on a role as a master or slave. The master modules control scheduling and data distribution tasks among themselves and the slaves. A rack can include storage (e.g., one or more network attached disks) that is shared by the one or more processing modules (104) and/or each processing module (104) may include its own storage. Additionally, or alternatively, there may be remote storage connected to the racks through a network.

The datacenter (100) may include dedicated optical links or other dedicated communication channels, as well as supporting hardware, such as modems, bridges, routers, switches, wireless antennas and towers. The datacenter (100) may include one or more wide area networks (WANs) as well as multiple local area networks (LANs).

Figure 2:
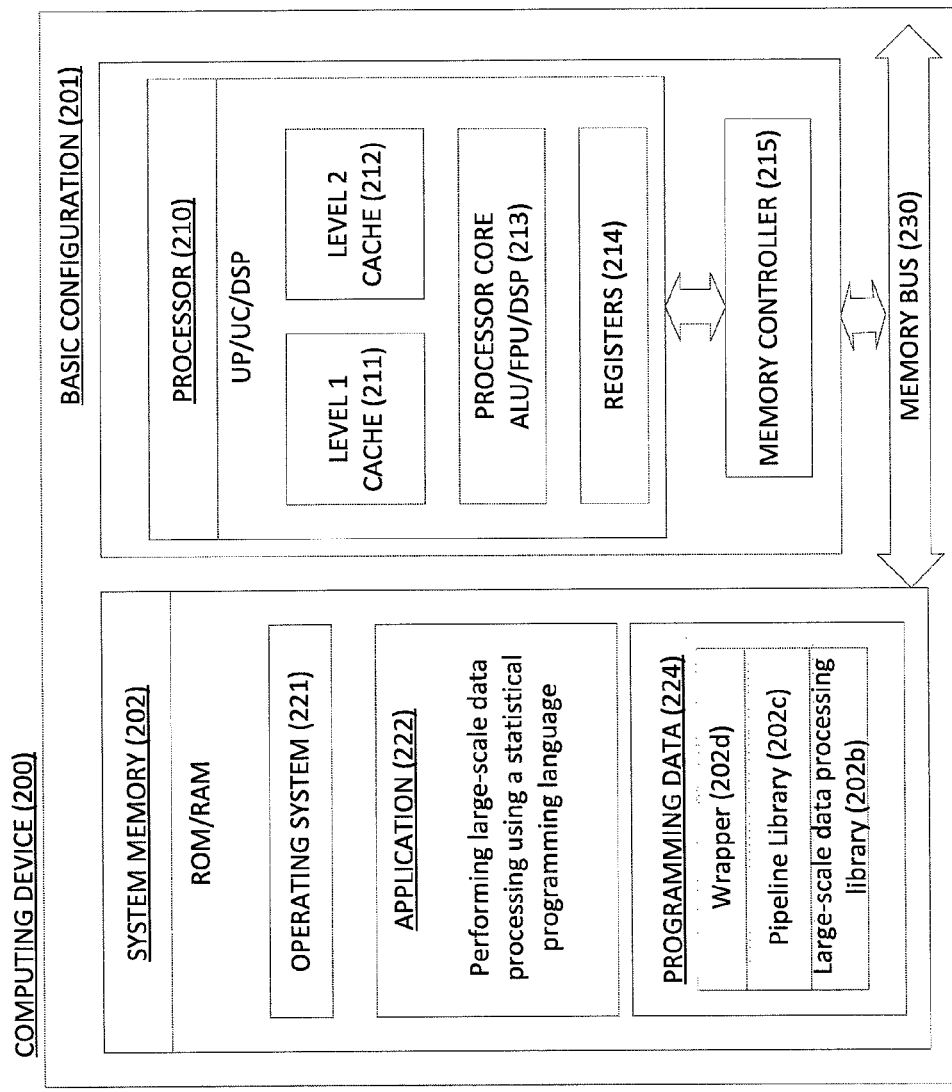
FIG. 2 is a block diagram illustrating an exemplary computing device.

FIG. 2 is a block diagram illustrating an example computing device (200) that may be used for one or more of the processing modules (104). In a very basic configuration (201), the computing device (200) typically includes one or more processors (210) and system memory (202). A memory bus (230) can be used for communicating between the processor (210) and the system memory (220).

Depending on the desired configuration, the processor (210) can be of any type including but not limited to a microprocessor (µP), a microcontroller (µC), a digital signal processor (DSP), or any combination thereof. The processor (210) can include one more levels of caching, such as a level one cache (211) and a level two cache (212), a processor core (213), and registers (214). The processor core (213) can include an arithmetic logic unit (ALU), a floating point unit (FPU), a digital signal processing core (DSP Core), or any combination thereof. A memory controller (216) can also be used with the processor (210), or in some implementations the memory controller (215) can be an internal part of the processor (210).

Depending on the desired configuration, the system memory (220) can be of any type including but not limited to volatile memory (such as RAM), non-volatile memory (such as ROM, flash memory, etc.) or any combination thereof. System memory (220) typically includes an operating system (221), one or more applications (222), and program data (224). The application (222) performs large-scale data processing using statistical programming language syntax which is familiar to data analysts and statisticians. Program Data (224) includes a library for large-scale data processing such as MapReduce or Pregel (202b), a pipeline library such as Flume (202c), and a high-level data wrapper package (202d) for translating between a high-level statistical programming language and lower-level libraries. The operating system (221) generally includes procedures for handling various basic system services and for performing hardware dependent tasks. In some embodiments, the application (222) can be arranged to operate on an operating system (221).

The computing device (200) can have additional features or functionality, and additional interfaces to facilitate communications between the basic configuration (201) and any required devices and interfaces.

System memory (220) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 200. Any such computer storage media can be part of the device (200).

The libraries (202b, 202c) and the high-level data wrapper package (202d) provide functions and classes that may be employed by the application software (222) to, using a statistical programming language, perform large-scale data processing and implement data-parallel pipelines in such large-scale data processing.

The library for large-scale data processing may support the MapReduce programming model for processing massive amounts of data in parallel. The MapReduce model generally involves breaking computations down into a mapreduce operation, which includes one or more map operations and may include a reduce operation. The process includes receiving a dataset as input, dividing the dataset into data blocks, parsing the data blocks into key/value pairs, sending key/value pairs through a user-defined map function to create a set of intermediate key/value pairs, and reducing the key/value pairs by combining values associated with the same key to produce a final value for each key. Implicit in this model is a shuffle operation, which involves grouping all of the values with the same key.

A mapreduce library may implement a map phase, a shuffle phase, and a reduce phase to support computations formulated according to the MapReduce model. In some implementations, to use the mapreduce library, a user program (or another library, such as a pipeline library) calls the mapreduce library, specifying information such as: the input file(s); the output files to receive the output data; and application-specific data processing operators for mapping and reducing.

The large-scale data processing library may also support a graph-based programming model such as the Pregel programming model. The Pregel model is used for large-scale graph processing and takes input that is a directed graph in which each vertex is uniquely identified by a string vertex identifier. Each vertex is associated with a modifiable, user defined value. The directed edges are associated with their source vertices, and each edge consists of a modifiable, user defined value and a target vertex identifier. The Pregel model generally involves expressing graphs as a sequence of iterations, in each of which a vertex can receive messages sent in the previous iteration, send messages to other vertices, and modify its own state and that of its outgoing edges or mutate graph topology.

A pregel library may provide users with a natural API for programming graph algorithms while managing the details of distribution invisibly, including messaging and fault tolerance. It is similar in concept to MapReduce.

Although libraries for large-scale data processing such as MapReduce and Pregel make the task of writing data-parallel code significantly easier for software developers, many computations may require data pipelines of distributed data processing operations. A data pipeline is a chain of processing elements arranges so that the output of each element is the input of the next. Programming and managing such pipelines can be difficult. Therefore, software developers may use a library for building scalable data processing pipelines such as Flume.

The pipeline library (202c) provides functions and classes that support data-parallel pipelines and, in particular, pipelines that include chains or directed graphs of large-scale data processing operations such as those from MapReduce or Pregel. In general, many real-world computations require a chain of large-scale data processing operations. While some logical computations can be expressed as a single data processing operation, other computations require a sequence or a graph of the operations.

Figure 3:
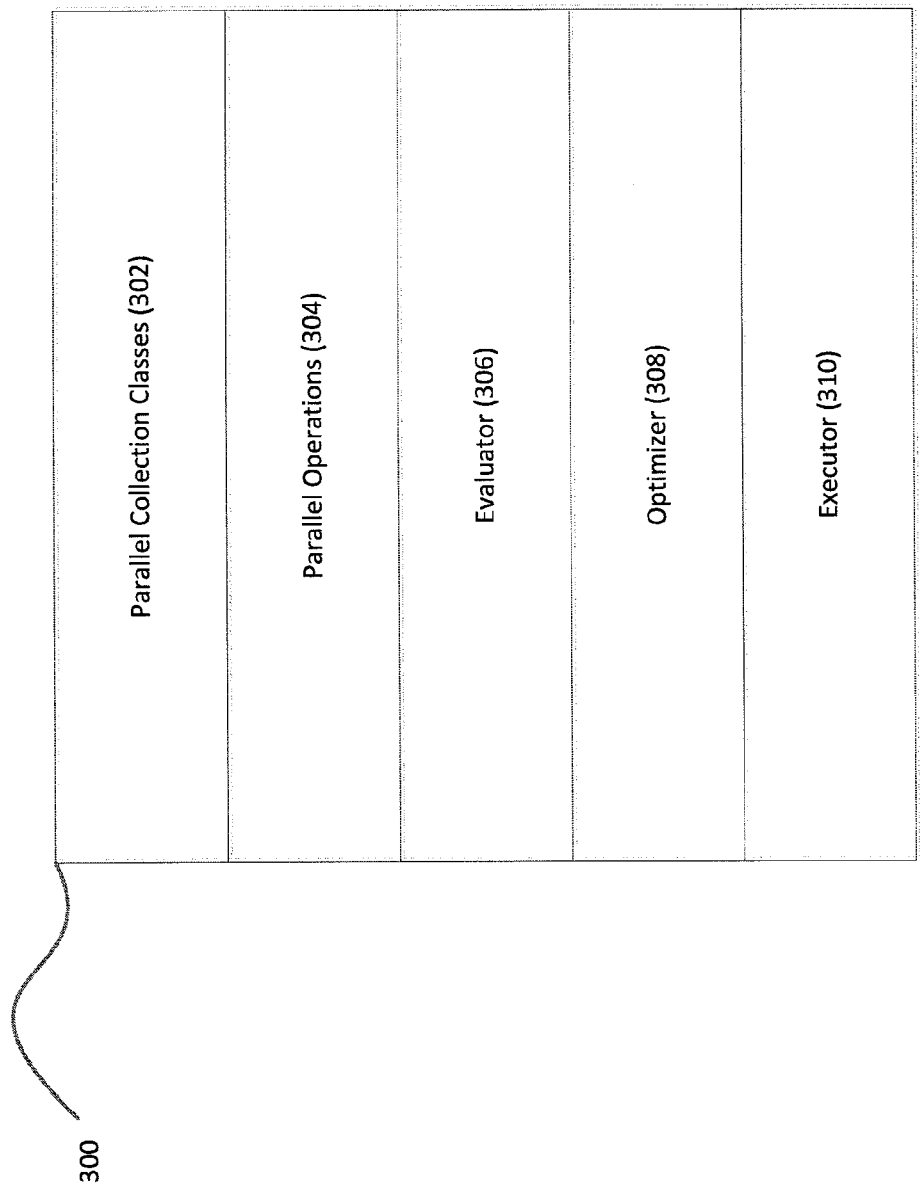
FIG. 3 is a block diagram illustrating an example of a pipeline library.

FIG. 3 is a block diagram illustrating an example of a pipeline library (300) that may be used to implement the pipeline library as shown in the computer device of FIG. 2 (202c). Although the pipeline library is shown within the computing device of FIG. 2, it may also be stored remotely. The pipeline library (300) includes one or more parallel data collection classes (302), one or more parallel operations (304), an evaluator (306), an optimizer (308), and an executor (310). In general, the parallel data collection classes (302) are used to instantiate parallel data objects that hold a collection of data, and the parallel operations (304) are used to perform parallel operations on the data held by the parallel data objects. The parallel operations (304) may be composed to implement data-parallel computations and an entire pipeline, or even multiple pipelines, can be implemented using the parallel collection classes (302) and parallel operations (304).

Parallel data collection classes (302) and operations (304) present a simple, high-level, uniform abstraction over many different data representations and over different execution strategies. The parallel data collection classes (302) abstract away the details of how data is represented, including whether the data is represented as an in-memory data structure, as one or more files, or as an external storage service. Similarly, parallel operations (304) abstract away their implementation strategy, such as whether an operation is implemented as a local, sequential loop, as a remote parallel invocation of a large-scale data processing library, as a query on a database, or as a streaming computation.

A pipeline library may implement parallel operations using deferred evaluation. The evaluator (306) may construct an internal execution plan dataflow graph that contains the operations and their arguments. Once the execution plan dataflow graph for the whole logical computation is constructed, the optimizer (308) revises the execution plan, for example, by applying graph transformations that fuse or combine chains of parallel operations together into a smaller number of combined operations. The revised execution plan may include a generalized mapreduce operation, for example, that includes multiple, parallel map operations and multiple, parallel reduce operations, but which can be translated into a single mapreduce operation with a single map function to implement multiple map operations and a single reduce function to implement the multiple reduce operations. The executor executes the revised operations using underlying primitives. When running the execution plan, the executor may choose which strategy to use to implement each operation based in part on the size of the data being processed. The executor may also place remote computations near the data on which they operate, and may perform independent operation in parallel.

The pipeline library may be implemented in any of a number of programming languages. The following describes examples of aspects of an implementation.

A pipeline library provides a parallel data collection class referred to as a PTable<K,V>, which represents an immutable multi-map. This class is an unordered set of key/value pairs with keys of type K and values of type V. Keys and values may be one of several resource types including: vectors, lists, dataframes, environments, and NULL. There may also be multiple entries with the same key. Additionally, the pipeline library may include a container for a single object of type T, which may be called PObject<T>. A PObject<T>'s associated methods are designed to operate on a single element.

A pipeline library may also include several methods that perform operations such as map-like operations. A map-like operation may transform a key,value pair into some number of other key,value pairs. These operations include: mapping; grouping key,value pairs by key; combining values; reducing values; sorting values; and flattening values.

As described above, the pipeline library executes parallel operations lazily, using deferred evaluation. The evaluator defers the evaluation of parallel operations, and instead constructs an internal execution plan data flow graph that contains the operations and arguments of the operations. Each parallel data object is represented internally either in deferred, not yet computed, or materialized, computed, state. A deferred parallel data object, for example, holds a pointer to the deferred operation that computes the parallel data object. A deferred operation, in turn, may hold references to the parallel data objects that are the arguments of the deferred operation and the deferred parallel data objects that are the results of the operation. As the data parallel pipeline is executed, the evaluator converts the parallel data objects and parallel operations into a directed graph of deferred, unevaluated objects and operations. This graph may be referred to as the execution plan or execution plan dataflow graph.

The optimizer fuses chains or subgraphs of parallel operations in the dataflow graph together into a smaller number of operations, some of which may be combined operations. The executor can then execute these operations using an underlying primitive or other logic.

While a large-scale data processing library combined with a library for building scalable data processing pipelines may be scalable to extremely large data sizes and may be an easier programming model for software developers than a parallel data processing library alone, this combination is not sufficient for data analysts and statisticians to efficiently analyze large-scale datasets because data analysts and statisticians need to learn a new programming model in order to use the pipeline library.

In an exemplary embodiment, a programming environment according to aspects of the inventive concepts includes a high-level data wrapper package as shown in FIG. 2. This data wrapper package wraps a pipeline library (202c). A data wrapper is a data structure or software that contains other data or software to enable the contained elements to exist in a different programming environment and to abstract the implementation details of the contained elements from the user of the data wrapper.

The exemplary wrapper package wraps the functionality from the pipeline library into distributed data objects. These distributed data objects may include implementations of functions and operations from a statistical programming language such as R. Statistical functions and operations include any number of functions and/or operations that can be used to analyze data. The data objects from the wrapper package may enable efficient analysis of large-scale datasets while providing normal statistical programming language syntax which is familiar to data analysts and statisticians.

Data may be stored as PTables containing a named collection of data elements. This collection may contain a chunk of all the objects that are related to each other by Map-like operations.

Figure 4:
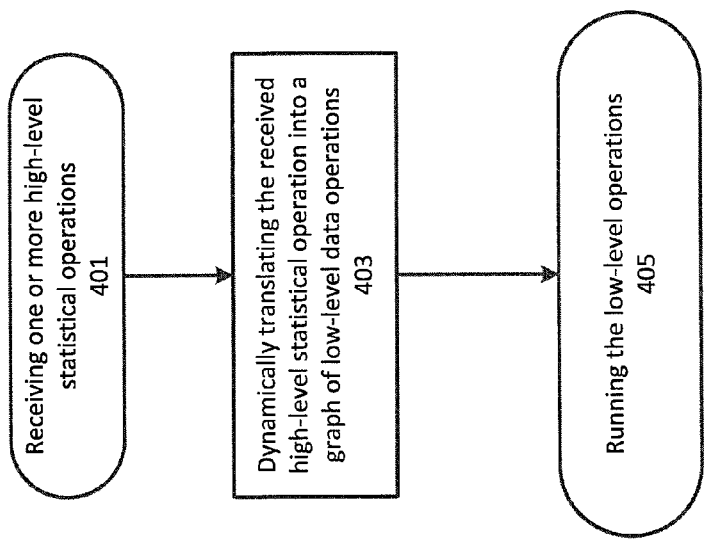
FIG. 4 is a flow chart illustrating an example of a process that may be performed to enable efficient analysis of large-scale datasets.

In some embodiments, as illustrated in FIG. 4, a method for data analysts or statisticians to analyze large-scale datasets using a statistical programming language begins with receiving one or more high-level statistical operations written in a statistical programming language such as R (401). The operations may explicitly involve reading or writing data to several different data repositories and may include data transformations.

After a high-level operation is received, the operation is dynamically translated into a graph of low-level data operations (403). The graph may be a directed, graph in which the nodes are the operations to perform and the edges are the data dependencies among the operations. Then, the low-level operations are run (405).

These low-level operations may be run either locally or on a distributed backend system. When an optimizer such as the one in the pipeline library depicted in FIG. 3 (308) runs, the optimizer may sum up the size of all the operations that the optimizer needs to process. If the total size of all the operations is less than a given threshold, for example 16 MB, the low-level operations may be run locally. Otherwise, the operations may be run on a distributed system. In some embodiments, a user can explicitly force local or distributed execution. Local execution can be useful for testing whereas distributed execution may be useful for computationally intensive jobs.

Running the operations may involve several sub-steps including multiple parallel data operations or local operations, which may be automatically scheduled. The results of the data operations may be written to a data repository. Once the results are put in a data repository, a data analyst or statistician may enter additional sequences of operations to be performed. Alternatively, if the result set or a subset of the results are small enough to fit into memory, the data or a subset of the data can be loaded into local memory for inspection.

Figure 5:
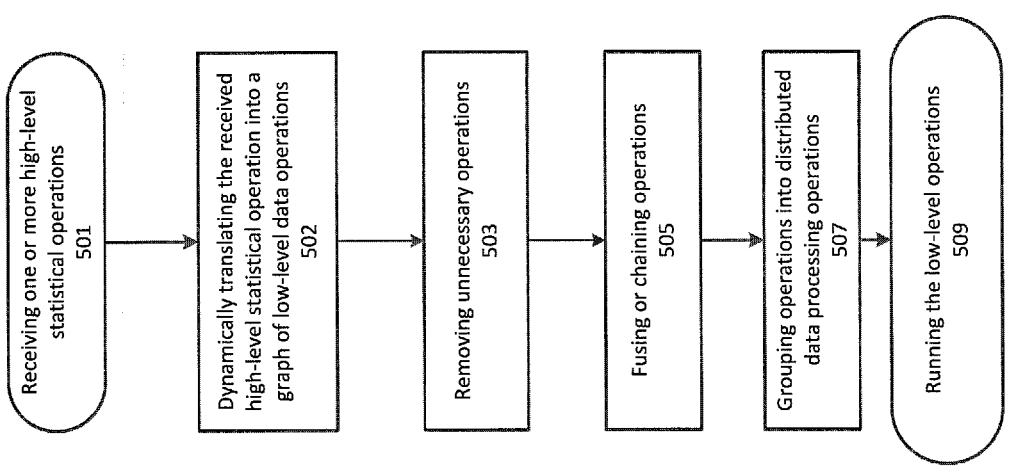
FIG. 5 is a flow chart illustrating an example of a process that may be performed to enable efficient analysis of large-scale datasets.

In other embodiments, once all the high-level operations and transformations have been received, the graph of operations can be automatically transformed into an efficient graph. FIG. 5 illustrates the process for generating an efficient graph of operations. In the process, unnecessary operations are removed (503). Similar or related operations can be fused, or chained, together (505). Operations can also be grouped into distributed data processing operations (507). This removal and optimization process may result in fewer operations being performed. The process may also result in an efficient use of computation time and resources.

An exemplary embodiment may be used to impute missing data into a statistical dataset. Although this operation is a somewhat simplistic, it is not an uncommon way of imputing missing data into statistical datasets. First, a high-level statistical operation may be received which specifies that any missing values in a field called "count" of a table labeled "data" should be replaced with the mean of all the non-missing values of "count" in the "data" table. The received statistical operation may be similar to the following R code: data$count[is.na(data$count)]←mean(data$count, na.rm=TRUE)

An exemplary process may dynamically translate the high-level statistical operations into the graph of operations to be run on a distributed data system using a high-level data wrapper package.

The translation process translates the high-level statistical operations into operations understood by a pipeline library. The pipeline library in turn calls large-scale data processing operations using a data processing library to perform the large-scale data processing. The translation process first finds the "data" table using the pipeline library. Then, the field "count" in the "data" table is found. The translation process, using the pipeline and the large-scale data processing libraries, determines which entries in the "data" table are missing values for the "count" field. The non-missing values of "count" are added together across the entire dataset. The sum of the non-missing values is divided by the number of "data" table entries which are not missing values for "count" to calculate the arithmetic mean of "count." The "data" table entries with missing values for count are then updated with the calculated mean.

In the cases where a large-scale data processing library such as MapReduce is used to input missing data into a statistical dataset, the single high-level statistical operation, data$count[is.na(data$count)]←mean(data$count, na.rm), implies at least three operations without aspects of the inventive concepts. One operation would find the missing values, the second would calculate the mean, and the third would replace the missing values. However, the exemplary process requires only two MapReduce operations, one operation to calculate the mean and one to replace the missing values because the operation to find the missing values can be fused into the same steps as calculating the mean and replacing the missing values. These operations may be merged with other operations when the graph of operations is optimized.

Given the example statistical operation above, if a subsequent step was added to calculate the logarithm of the data in the data table, y←log(data), a customary process would require a distinct MapReduce operation to perform the computation of the logarithm. However, the exemplary process can fuse this operation into the mapper of the second MapReduce operation, the operation which replaces the missing values, without adding any more MapReduce steps.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for enabling efficient analysis of large-scale datasets comprising:
   receiving one or more first high-level statistical operations;
   dynamically translating the first high-level statistical operations into a graph of low-level data operations defining dependencies among the low-level data operations that will produce a result for the first high-level statistical operations when the low-level data operations are executed according to the graph;
   receiving, after dynamically translating the first high-level statistical operations, a second high-level statistical operation;
   adding an additional low-level data operation to the graph to define dependencies among the low-level data operations that will produce a result for the first high-level statistical operations and for the second high-level statistical operations;
   automatically transforming the graph of low-level data operations into an efficient graph by reducing the number of low-level data operations in the graph to define dependencies among the low-level data operations that will produce the same result as running the low-level data operations according to the graph; and
   running the low-level data operations according to the efficient graph to produce the result.

2. The computer-implemented method of claim 1, wherein automatically transforming the graph of low-level data operations into an efficient graph comprises:
   removing unneeded operations;
   fusing operations together; and
   grouping operations into parallel data processing operations.

3. The computer-implemented method of claim 1, wherein the low-level data operations can be run on a distributed backend system.

4. The computer-implemented method of claim 1, wherein the low-level data operations can be run locally.

5. The computer-implemented method of claim 1, wherein where the low-level data operations should be run is determined by calculating the sum of the low-level data operations size and comparing the sum to a given threshold.

6. The computer-implemented method of claim 5, wherein responsive to the sum being less than the given threshold, the low-level operations are run locally.

7. The computer-implemented method of claim 5, wherein responsive to the sum being greater than or equal to the given threshold, the low-level operations are run on a distributed backend system.

8. The computer-implemented method of claim 1, wherein a user can choose to run the low-level data operations locally.

9. The computer-implemented method of claim 1, wherein a user can choose to run the low-level data operations on a distributed backend system.

10. A system for enabling efficient analysis of large-scale datasets comprising:
    one or more processing devices; and
    one or more storage devices, the storage devices storing instructions that, when executed by the one or more processing devices, cause the processing devices to perform operations comprising:
    receiving one or more first high-level statistical operations;
    dynamically translating the first high-level statistical operations into a graph of low-level data operations defining dependencies among the low-level data operations that will produce a result for the first high-level statistical operations when the low-level data operations are executed according to the graph;
    receiving, after dynamically translating the first high-level statistical operations, a second high-level statistical operation;
    adding an additional low-level data operation to the graph to define dependencies among the low-level data operations that will produce a result for the first high-level statistical operations and for the second high-level statistical operations;
    automatically transforming the graph of low-level data operations into an efficient graph to define dependencies among the low-level data operations that will produce the same result as running the low-level data operations according to the graph; and
    running the low-level data operations according to the efficient graph to produce the result.

11. The system of claim 10, wherein automatically transforming the graph of low-level data operations into an efficient graph comprises:
    removing unneeded operations;
    fusing operations together; and
    grouping operations into parallel data processing operations.

12. The system of claim 10, wherein the low-level data operations can be run on a distributed backend system.

13. The system of claim 10, wherein the low-level data operations can be run locally.

14. The system of claim 10, wherein where the low-level data operations should be run is determined by calculating the sum of the low-level data operations size and comparing the sum to a given threshold.

15. The system of claim 14, wherein responsive to the sum being less than the given threshold, the low-level operations are run locally.

16. The system of claim 14, wherein responsive to the sum being greater than or equal to the given threshold, the low-level operations are run on a distributed backend system.

17. The system of claim 14, wherein a user can choose to run the low-level data operations locally.

18. The system of claim 14, wherein a user can choose to run the low-level data operations on a distributed backend system.

* * * * *